US011423116B2

(12) United States Patent
Gross et al.

(10) Patent No.: US 11,423,116 B2
(45) Date of Patent: Aug. 23, 2022

(54) AUTOMATICALLY CREATING LAMBDA FUNCTIONS IN SPREADSHEET APPLICATIONS

(71) Applicant: Microsoft Technology Licensing, LLC, Redmond, WA (US)

(72) Inventors: Christopher John Gross, Seattle, WA (US); Johnny Campbell, Woodinville, WA (US); Andrew James Becker, Duvall, WA (US); Claudio Vittorio Russo, Girton (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/024,580

(22) Filed: Jun. 29, 2018

(65) Prior Publication Data
US 2020/0004799 A1 Jan. 2, 2020

(51) Int. Cl.
*G06F 17/11* (2006.01)
*G06F 40/18* (2020.01)

(52) U.S. Cl.
CPC .............. *G06F 17/11* (2013.01); *G06F 40/18* (2020.01)

(58) Field of Classification Search
CPC ......... G06F 3/0482; G06F 40/18; G06F 17/11
See application file for complete search history.

(56) References Cited

U.S. PATENT DOCUMENTS

| 5,768,158 | A | * | 6/1998 | Adler | G06F 40/18 715/209 |
| 5,880,742 | A | | 3/1999 | Rao et al. | |
| 6,138,130 | A | * | 10/2000 | Adler | G06F 40/174 715/209 |
| 9,286,286 | B1 | * | 3/2016 | Ghaddar | G06F 40/18 |
| 2002/0118221 | A1 | | 8/2002 | Hudson et al. | |
| 2003/0056181 | A1 | | 3/2003 | Marathe et al. | |
| 2004/0103366 | A1 | * | 5/2004 | Peyton-Jones | G06F 40/18 715/213 |
| 2007/0198538 | A1 | * | 8/2007 | Palacios | G06F 16/2428 |
| 2007/0244672 | A1 | | 10/2007 | Kjaer | |

(Continued)

OTHER PUBLICATIONS

"Notice of Allowance Issued in U.S. Appl. No. 16/024,566", dated Jul. 31, 2019, 8 Pages.
(Continued)

*Primary Examiner* — Justin S Lee

(57) ABSTRACT

Examples discussed herein relate to automatically creating lambda functions in spreadsheet applications, e.g., Microsoft Excel®. In an implementation, a method of automatically creating lambda functions in spreadsheet applications using a lambda shorthand notation is disclosed. The method includes analyzing contents of a cell of a spreadsheet to identify a formulaic expression and determining that the formulaic expression can define a body of a lambda function without using explicit lambda function notation or parameter declarations. The method further includes automatically creating and invoking the lambda function responsive to the determination. As discussed herein, creating the lambda function includes registering the lambda function in a lambda registry using the formulaic expression as the body of the lambda function that evaluates into an output value.

20 Claims, 12 Drawing Sheets

(56) References Cited

U.S. PATENT DOCUMENTS

| | | | |
|---|---|---|---|
| 2009/0276482 | A1 | 11/2009 | Rae et al. |
| 2009/0319542 | A1 | 12/2009 | Le Brazidec et al. |
| 2010/0261526 | A1* | 10/2010 | Anderson ............... G06F 3/017 463/31 |
| 2011/0289396 | A1 | 11/2011 | Oh |
| 2012/0191642 | A1 | 7/2012 | George |
| 2013/0067305 | A1 | 3/2013 | Golan |
| 2013/0104020 | A1 | 4/2013 | Patterson |
| 2013/0179764 | A1 | 7/2013 | Battagin et al. |
| 2015/0309980 | A1 | 10/2015 | Glass et al. |
| 2017/0084197 | A1* | 3/2017 | Crouse ................. G09B 19/025 |
| 2017/0124053 | A1 | 5/2017 | Campbell |
| 2017/0228358 | A1 | 8/2017 | Hirzel et al. |
| 2018/0157468 | A1* | 6/2018 | Stachura ................... G06F 8/38 |
| 2018/0295194 | A1 | 10/2018 | Deraz et al. |
| 2020/0004811 | A1 | 1/2020 | Gross et al. |
| 2020/0004812 | A1 | 1/2020 | Gross et al. |

OTHER PUBLICATIONS

"Non Final Office Action Issued in U.S. Appl. No. 16/024,598", dated Aug. 19, 2019, 20 Pages.

"Non Final Office Action Issued in U.S. Appl. No. 16/024,556", dated Oct. 11, 2019, 16 Pages.

Cortes, et al., "User-Defined Functions in Spreadsheets", In Masters Thesis Submitted in Software Development IT University of Copenhagen, Sep. 2006, 119 Pages.

"International Search Report and Written Opinion Issued in PCT Application No. PCT/US2019/037833", dated Oct. 2, 2019, 12 Pages.

"International Search Report and Written Opinion Issued in PCT Application No. PCT/US2019/037837", dated Oct. 2, 2019, 12 Pages.

"International Search Report and Written Opinion Issued in PCT Application No. PCT/US2019/037840", dated Oct. 2, 2019, 12 Pages.

Sestoft, Peter, "Online Partial Evaluation of Sheet-Defined Functions", In Electronic Proceeding in Theoretical Computer Science, vol. 129, Sep. 19, 2013, pp. 136-160.

Sestoft, et al., "Sheet-Defined Functions: Implementation and Initial Evaluation", In Proceeding of International Symposium End-User Development, Jun. 10, 2013, pp. 88-103.

"International Search Report and Written Opinion Issued in PCT Application No. PCT/US2019/037412", dated Oct. 28, 2019, 11 Pages.

"Non Final Office Action Issued in U.S. Appl. No. 16/024,556", dated Sep. 8, 2020, 14 Pages.

"Final Office Action Issued in U.S. Appl. No. 16/024,556", dated Feb. 26, 2020, 17 Pages.

* cited by examiner

| | A | B | C | D | E |
|---|---|---|---|---|---|
| D1 | | | =SUM(Series1)+SUM(Series1) | | |
| 1 | 2 | | | | |
| 2 | 25 | | =SUM(Series1) | =SUM(Series1)+SUM(Series1) | |
| 3 | 18 | | | | |
| 4 | 15 | | =SUM(Series1) | | |
| 5 | 28 | | | | |
| 6 | 50 | | | =SUM(Series1) | |
| 7 | 12 | | | | |
| 8 | 240 | | | =SUM(Series1) | |
| 9 | 30 | | | | |
| 10 | 50 | | | | |
| 11 | | | | | |
| 12 | | | | | |

Sheet1 | Sheet2 | Sheet3

FIGURE 6A

| | A | B | C | D | E |
|---|---|---|---|---|---|
| 1 | 2 | | =LET(mySum, SUM(Series1), mySum + mySum) | =LET(mySum, SUM(Series1), mySum + mySum) | |
| 2 | 25 | | | | |
| 3 | 18 | | =mySum | | |
| 4 | 15 | | | | |
| 5 | 28 | | | =mySum | |
| 6 | 50 | | | =mySum | |
| 7 | 12 | | | | |
| 8 | 240 | | | | |
| 9 | 30 | | | | |
| 10 | 50 | | | | |
| 11 | | | | | |
| 12 | | | | | |

FIGURE 6B

AUTOMATICALLY CREATING LAMBDA FUNCTIONS IN SPREADSHEET APPLICATIONS

CROSS REFERENCE TO RELATED APPLICATIONS

This application is related to co-pending U.S. patent application Ser. No. 16/024,556, entitled "RENDERING LAMBDA FUNCTIONS IN SPREADSHEET APPLICATIONS," U.S. patent application Ser. No. 16/024,598, entitled "DISTRIBUTION OF LAMBDA FUNCTIONS," and U.S. patent application Ser. No. 16/024,566, entitled "CREATING AND HANDLING LAMBDA FUNCTIONS IN SPREADSHEET APPLICATIONS," all of which were filed on the same day as this application, the contents of which are all expressly incorporated by reference herein.

BACKGROUND

Spreadsheet applications such as, for example, Microsoft Excel®, are widely used in many fields and are increasingly important for analyzing data in today's business and computing environments. For example, data analysts use spreadsheet applications as tools for performing spreadsheet tasks including, but not limited to, consolidating and massaging data, producing charts, performing complex calculations, and the like.

The analysis on data input into spreadsheets is often complex. For example, it is not uncommon for spreadsheets to contain hundreds or thousands of formulae. These spreadsheets often comprise purely-functional programs that lack modularity, rely on copy/paste duplication (of formulae, of whole workbooks), utilize little or no naming, and are otherwise extremely burdensome to create and maintain.

User Defined Functions (UDFs) are supported by many spreadsheet applications and generally address the problems above. Unfortunately, utilizing UDF functionality in today's spreadsheet applications can be extremely complex and time consuming as users must learn at least one programming language, e.g., Visual Basic for Applications (VBA), C++, JavaScript, etc., to code and update the UDFs. Additionally, scalability and cross-platform portability can become an issue due to the lack of native support for UDFs.

Overall, the examples herein of some prior or related systems and their associated limitations are intended to be illustrative and not exclusive. Upon reading the following, other limitations of existing or prior systems will become apparent to those of skill in the art.

BRIEF SUMMARY

Examples discussed herein relate to automatically creating lambda functions in spreadsheet applications, e.g., Microsoft Excel®. In an implementation, a method of automatically creating lambda functions in spreadsheet applications using a lambda shorthand notation is disclosed. The method includes analyzing contents of a cell of a spreadsheet to identify a formulaic expression and determining that the formulaic expression can define a body of a lambda function without using explicit lambda function notation or parameter declarations. The method further includes automatically creating and invoking the lambda function responsive to the determination. As discussed herein, creating the lambda function includes registering the lambda function in a lambda registry using the formulaic expression as the body of the lambda function that evaluates into an output value.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 6A and 6B depict example lambda expression optimizations for spreadsheet applications, according to some implementations.

DETAILED DESCRIPTION

Figure 1:
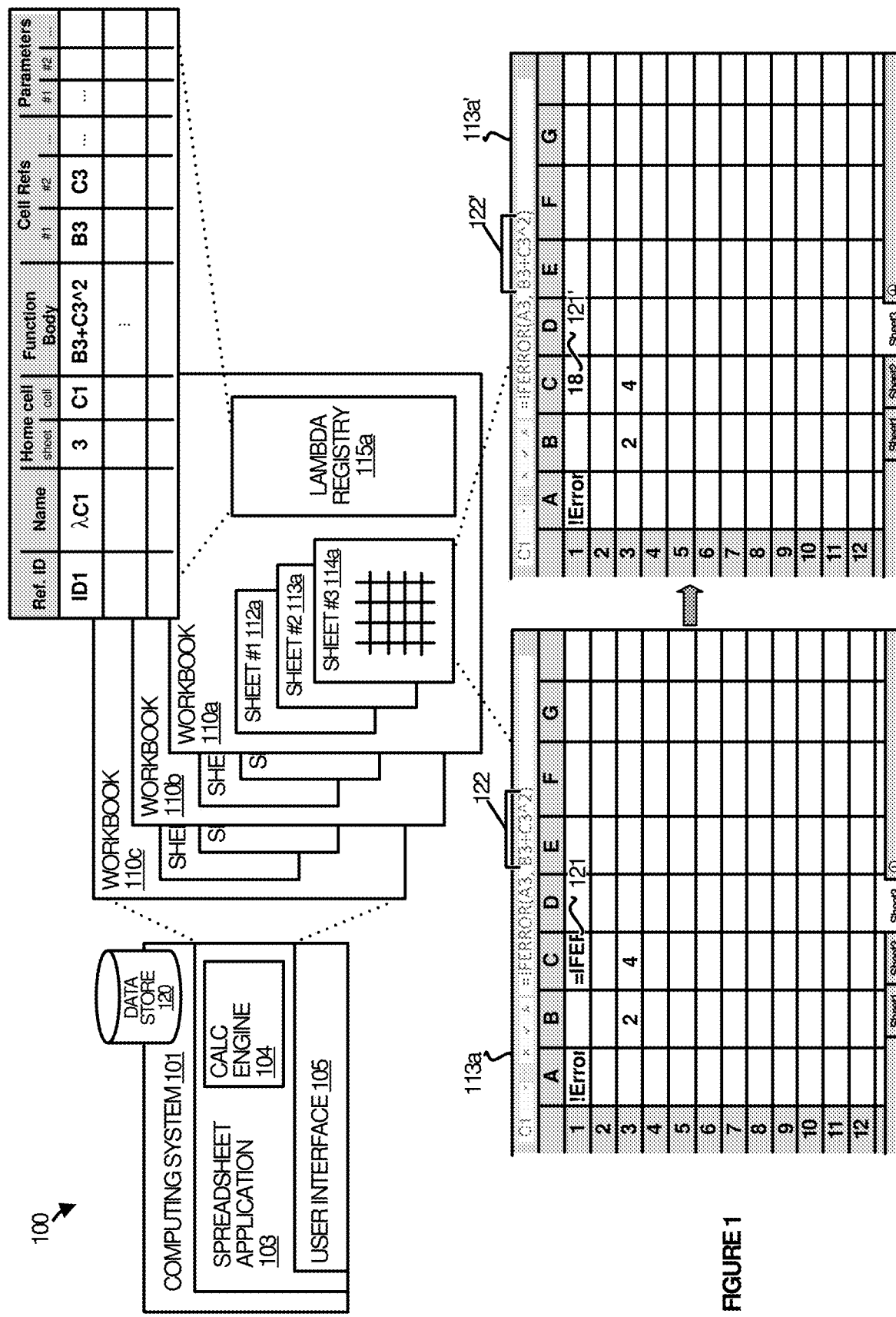
FIG. 1 depicts a block diagram illustrating an example operational architecture for automatically creating a lambda function in a spreadsheet application using a lambda shorthand notation, according to some implementations.

Technology is disclosed herein for automatically creating lambda functions in spreadsheet applications. More specifically, the techniques described herein allow a user to automatically create and invoke lambdas (or lambda functions) in spreadsheet applications using formulaic expressions that do not include explicit lambda notation (without using the lambda function syntax, e.g., =FUN(X1, . . . Xn, F), where X1-Xn are parameters and F is a function body (or formula) that evaluates into a function value). Among other improvements, the techniques discussed herein provide users that might have a need for lambdas, but do not know how to create them, with an ability to automatically create lambda functions. In addition, the techniques can act as a useful shorthand for users that are well-versed in creating lambdas.

As discussed herein, lambdas are user (or custom) defined functions (UDFs) that are natively creatable within a cell of a spreadsheet and maintainable within a spreadsheet application using a lambda registry. The registration can include recording a number of fields including a home cell that identifies a location of the spreadsheet where the lambda function is defined. Other fields can include identifier field (ID), Name, function body (or formula) fields, etc. In some implementations, a lambda registry can be created and associated with each workbook (or spreadsheet file). As discussed herein, each workbook (or spreadsheet file) includes one or more sheets (or spreadsheet grids).

In some implementations, the formulaic expression comprises an argument to a second function in the cell of the spreadsheet. For example, the second function can include at least one data parameter and at least one conditional parameter, where the formulaic expression comprises an argument corresponding to the conditional parameter. Additionally, in some implementations, the formulaic expression can include an implied variable (e.g., #item) that references data passed to the second function via the at least one data parameter.

In some implementations, the spreadsheet application is adapted with a repeated expression optimization engine configured to analyze expressions in one or more cells of a spreadsheet to identify a repeated expression, automatically create a LET or lambda function defined by the repeated expression and replace each repeated expression with a reference to the LET or lambda function. For example, if a cell is populated with the formula "=SUM(A1:A26)+SUM (A1:A26)," then a spreadsheet application typically performs the sum operation on the same data set [A1:A26] two separate times. Providing detection and replacement mechanisms, e.g., LET, allows the expression to be performed once regardless of the number of instances in which it is called in a spreadsheet application.

In some implementations, the spreadsheet application is adapted with a function extraction optimization engine configured to detect expressions with common structure and replace each occurrence by the application of a signal, general lambda function applied to occurrence specific arguments.

Various technical effects are enabled by the techniques discussed herein. For example, the techniques enable users to more easily create and define lambdas (or lambda functions) within a spreadsheet application without using or needing to learn an external programming language. Moreover, the ability to automatically create and define lambda functions in a spreadsheet allows for various optimizations that speed up the execution of formulas. In addition to the clear ease of use and functional improvements to spreadsheet applications, native support for the lambda functions can also improve scalability and portability of spreadsheets that utilize UDFs. Furthermore, because spreadsheet applications lambdas are functions which can act like data, the lambda functions enable recursion within a spreadsheet application, e.g., by the function calling itself.

FIG. 1 depicts a block diagram illustrating an example operational architecture 100 for automatically creating lambda functions in spreadsheet applications, according to some implementations. More specifically, the example architecture 100 illustrates dynamically creating and invoking lambdas (or lambda functions) in spreadsheet applications using expressions that do not include explicit lambda notation. The operational architecture 100 includes a computing system 101 on which a spreadsheet application 103 may be implemented and a data store 120 on which the spreadsheet application 103 and data contained therein is stored.

Figure 8:
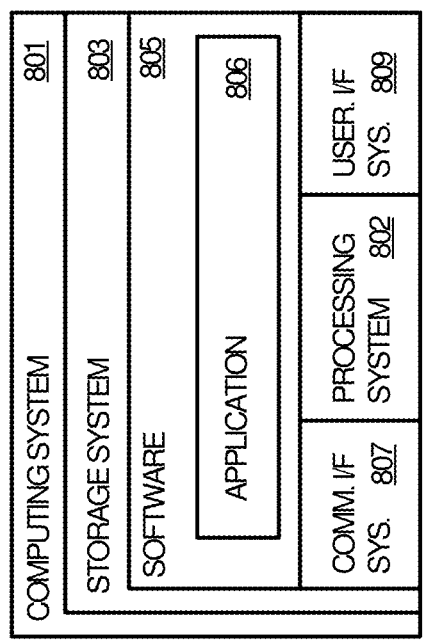
FIG. 8 is a block diagram illustrating a computing system suitable for implementing the technology disclosed herein, including any of the applications, architectures, elements, processes, and operational scenarios and sequences illustrated in the Figures and discussed below in the Technical Disclosure.

The spreadsheet application 103 can include functionality including GUIs (graphical user interface) running on computing system 101, e.g., a PC, mobile phone device, a Web server, or other application servers. Such systems may employ one or more virtual machines, containers, or any other type of virtual computing resource in the context of supporting remote micro-services as native functions within the spreadsheet application 103 of which the computing system 801 of FIG. 8 is representative. The spreadsheet application 103 includes a calculation engine 104 which can assist with driving a user interface 105 to the spreadsheet application 103.

The spreadsheet application 103 can include multiple workbooks, e.g., workbooks 110a-110c. Additional or fewer workbooks are possible. Each workbook can include one or more sheets and a lambda registry. As shown in the example of FIG. 1, workbook 110a includes sheet #1 112a, sheet #2 113a, and sheet #3 114a, and an associated or corresponding lambda registry 115a. Three worksheets are shown for simplicity, each workbook can include additional or fewer sheets. Additionally, while each workbook, e.g., spreadsheet file, is shown as having an associated or corresponding lambda registry, it is appreciated that in some implementations, additional or fewer lambda registries can be utilized. For example, a single registry could be used across multiple workbooks or multiple lambda registries could be associated or corresponding to a single workbook. In some implementations, a registry list is also maintained that identifies workbooks and related or corresponding registries. An example is shown and discussed in greater detail with reference to FIG. 2.

As shown in the example of FIG. 1, the lambda registry contains various fields including a reference identifier (ID) field, a Name field, a Home Cell field, one or more cell reference fields, and one or more parameter fields. Additional or fewer fields are possible.

As discussed above, lambda notation function syntax can be defined in some spreadsheet applications. The lambda notation function syntax allows users to create and store the lambda functions within a cell of the spreadsheet. However, lambda functions can also be created using a lambda shorthand (e.g., without using the explicit lambda notation function syntax). Among other improvements, the shorthand allows users that might have a need for lambdas, but do not know how to create them, with an ability to do so. Additionally, the shorthand can act as a useful shortcut for users that are well-versed in creating lambdas.

In one example of operation, one or more components of spreadsheet application 103 analyze contents of a cell, e.g., contents 121 of cell C1 of sheet 114a, to identify a formulaic expression 122. As shown in the example of FIG. 1, the contents of cell C3 comprise the formula '=IFERROR(A3, B3+C3^2)' and the spreadsheet application identifies the formulaic expression 'B3+C3^2'. The one or more components of spreadsheet application then determine if the formulaic expression 122 can define a body of a lambda function without using explicit lambda function notation or parameter declarations. For example, the cell C1 is not populated with an expression that defines a lambda function, e.g., =FUN(X1, . . . Xn, F), where X1-Xn are parameters and F is a function body (or formula) that evaluates into a function value.

Instead, the spreadsheet application detects that cell C1 of sheet 114a contains a formulaic expression 122, e.g., 'B3+C3^2', that defines a body of a lambda function. Responsive to this determination, the one or more components of the spreadsheet application automatically create and invoke the lambda function. As discussed herein, to create the lambda function, the spreadsheet application registers the lambda function in a lambda registry 115a using the formulaic expression (or formula) as the body of the lambda function that evaluates into a function value.

In some implementations, the registration can include recording a home cell in the lambda registry 115a that identifies a location of the cell of the spreadsheet where the lambda function is defined. The location indicates a sheet and cell within a workbook. As shown in the example of FIG. 1, the home cell is Sheet 3 114a, cell C1 of workbook 110a.

In some implementations, the lambda registration process can include determining various other names and/or values and recording those names and/or values with the lambda registry 115a. For example, the formulaic expression 'B3+C3^2' includes a reference to cells B3 and C3. Although not shown in the example of FIG. 1, the formulaic expression 122 can include one or more variables. In such instances, the spreadsheet application can parse the expression to detect the variables and register the variables as parameters when dynamically creating the lambda function. An example illustrating this process is shown and discussed in greater detail with reference to FIGS. 4A and 4B.

As discussed herein, the formulaic expression 122 is operable to define the lambda function C1 using shorthand and simultaneously invoke the lambda function in order to calculate and return an output value 121'. As shown in the example of FIG. 1, the expression invokes the lambda function with no arguments. Responsive to the invocation, the one or more components of spreadsheet application 103 consult the lambda registry 115a to identify the formula expressed in the function body of the lambda function, e.g., F=B3+C3^2 and determine an output value of the lambda function based on a formula. As shown in the example of FIG. 1, the output value of the lambda function is calculated as follows:

Sheet3!$B$3:2

Sheet3!C3:4

$\lambda C1=B3+C3^2=18$

In some implementations, the contents of the cell include one or more parameters of a second function. For instance, the contents of cell C3 comprise the formula '=IFERROR(A3, B3+C3^2),' wherein the formulaic expression 'B3+C3^2' is a parameter of the IFERROR function, e.g., the second function. The IFERROR function typically receives two values (or expressions) and tests if the first of these evaluates to an error. If the first supplied value does not evaluate to an error, the first value is returned. However, if the first supplied value does evaluate to an error, the second supplied value is returned.

After evaluating the output value of the lambda function, the one or more components of the spreadsheet application calculates an output value of the second function as follows: Sheet3!C1:=IFERROR(A3, $\lambda C1$)=IFERROR(!Error, 18)=18.

Figure 2:
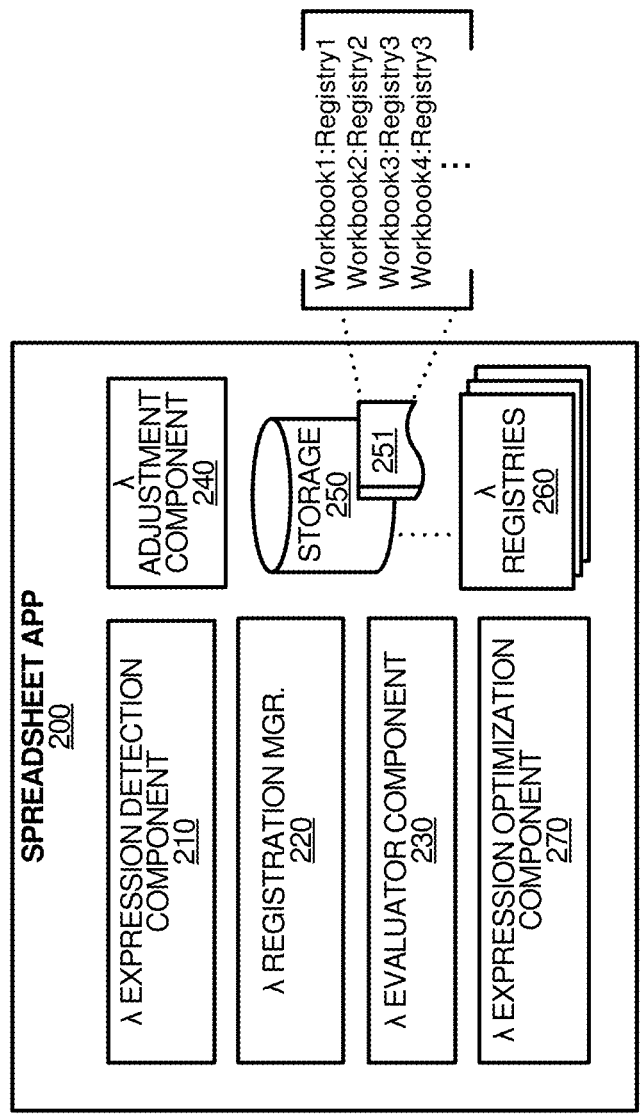
FIG. 2 depicts example components of a spreadsheet application, according to some implementations.

FIG. 2 depicts example components of a spreadsheet application 200, according to some embodiments. The spreadsheet application 200 can be spreadsheet application 103 of FIG. 1, although alternative configurations are possible. The functions represented by the components, modules, managers and/or engines described with reference to FIG. 2 can be implemented individually or in any combination thereof, partially or wholly, in hardware, software, or a combination of hardware and software. Additionally, although illustrated as discrete components, the operation and functionality of the components, modules, managers and/or engines described with reference to FIG. 2 can be integrated anywhere within the spreadsheet application 200 including, but not limited to, the calculation engine 104.

As illustrated in the example of FIG. 2, the spreadsheet application 200 includes a $\lambda$ expression detection component 210, a $\lambda$ registration manager 220, a $\lambda$ evaluator 230, a $\lambda$ adjustment component 240, a storage container 250 and $\lambda$ expression optimization component 260. Other systems, databases, and/or components are also possible. Various components can also be omitted in some implementations.

The $\lambda$ expression detection component 210 is configured to detect that a cell of a spreadsheet is populated with an expression that defines a lambda function. As discussed above, explicit lambda function syntax (or notation) such as, for example, FUN(X1, . . . Xn, F) or FUNCTION(X1, . . . Xn, F), where X1-Xn are parameters and F is a function body (or formula) that evaluates into a function value, is supported by the spreadsheet application. This lambda function syntax (or notation) allows users to create and store the lambda functions within a cell of the spreadsheet. The $\lambda$ expression detection component 210 can detect these explicit expressions.

As discussed herein, the $\lambda$ expression detection component 210 can also detect lambda shorthand notation. For example, the $\lambda$ expression detection component 210 can analyze contents of a cell of a spreadsheet to identify a formulaic expression and determine whether the formulaic expression can define a body of a lambda function without using explicit lambda function notation or parameter declarations.

The $\lambda$ registration manager 220 is configured to register the lambda function with a lambda registry corresponding to the spreadsheet. As discussed herein, each workbook, e.g., spreadsheet file, can include an associated or corresponding lambda registry. In some implementations, a single registry can be used across multiple workbooks or multiple lambda registries could be associated or corresponding to a single workbook. As shown in the example, of FIG. 2, storage container 250 includes a registry list 251 that identifies workbooks and related or corresponding registries. Example registration of a lambda function is shown and discussed in greater detail with reference to FIG. 3.

The $\lambda$ registration manager 220 is configured to register the lambda function with a lambda registry corresponding to the spreadsheet. As discussed herein, each workbook, e.g., spreadsheet file, can include an associated or corresponding lambda registry. In some implementations, a single registry can be used across multiple workbooks or multiple lambda registries could be associated or corresponding to a single workbook. As shown in the example, of FIG. 2, storage container 250 includes a registry list 251 that identifies workbooks and related or corresponding registries.

In some implementations, the λ registration manager 220 automatically creates the lambda function responsive to a determination that a formulaic expression can define a body of a lambda function without using explicit lambda function notation or parameter declarations. In such instances, to create the lambda function, the λ registration manager 220 registers the lambda function in a lambda registry using the formulaic expression as the body of the lambda function that evaluates into a function value.

The λ evaluator 230 is configured to evaluate formulas included in the body of a lambda function when the lambda function is invoked. In some implementations, the λ evaluator 230 calculates an output value of the lambda function using a formula expressed in the function body and optional (function dependent) arguments that can be passed to the lambda function. Once determined, the output value can be stored in association with the cell. As discussed herein, in some implementations, the λ evaluator 230 is configured to automatically evaluate a newly created lambda function responsive to a determination that a formulaic expression can define a body of a lambda function without using explicit lambda function notation or parameter declarations.

The 2 adjustment component 240 is configured to detect cell adjustment events and responsively access the lambda registry to identify one or more cells referenced by a body of the lambda function that are affected by the cell adjustment event and modify the one or more cells to account for the adjustment to the one or more cell locations.

The storage container 250 includes a registry list 251 and λ registries 260. The storage container 250 can be data store 120 of FIG. 1, although alternative configurations are possible. Likewise, λ registries 260 can be lambda registries 115a-115c of FIG. 1, although alternative configurations are possible.

The λ expression optimization component 270 is configured to analyze cells of a spreadsheet to identify expressions that can be used to create lambda functions to provide a level of abstraction. The automatic creation of a lambda function provides a number of benefits including, but not limited to, improved editability and execution time as the lambda calculation can, in some instances, occur only once regardless of the number of cells that reference the lambda function.

In some implementations, the λ expression optimization component 270 is configured to identify repeated expressions and automatically create a LET or a lambda function defined by the repeated expression. The cells containing the repeated expression are then provided with a reference to the LET or the lambda function. For example, if a cell is populated with the formulaic expression "=SUM(A1:A26)+SUM(A1:A26)," then a spreadsheet application typically performs the sum operation on the same data [A1:A26] two separate times. Providing a detection and abstraction mechanism allows the expression to be performed once regardless of the number of instances in which the formulaic expression is referenced in the spreadsheet. An example illustrating repeated expression optimization is shown and discussed in greater detail with reference to FIGS. 6A and 6B.

In some implementations, the λ expression optimization component 270 is configured to detect and extract a common formulaic expression referenced by cells in a spreadsheet. For example, the spreadsheet application is configured with a function extraction optimization engine configured to analyze multiple cells of a spreadsheet to detect and extract expressions with one or more variables and automatically create a lambda function using the extracted expressions. An example illustrating function detection and abstraction is shown and discussed in greater detail with reference to FIGS. 7A and 7B.

Figure 3:
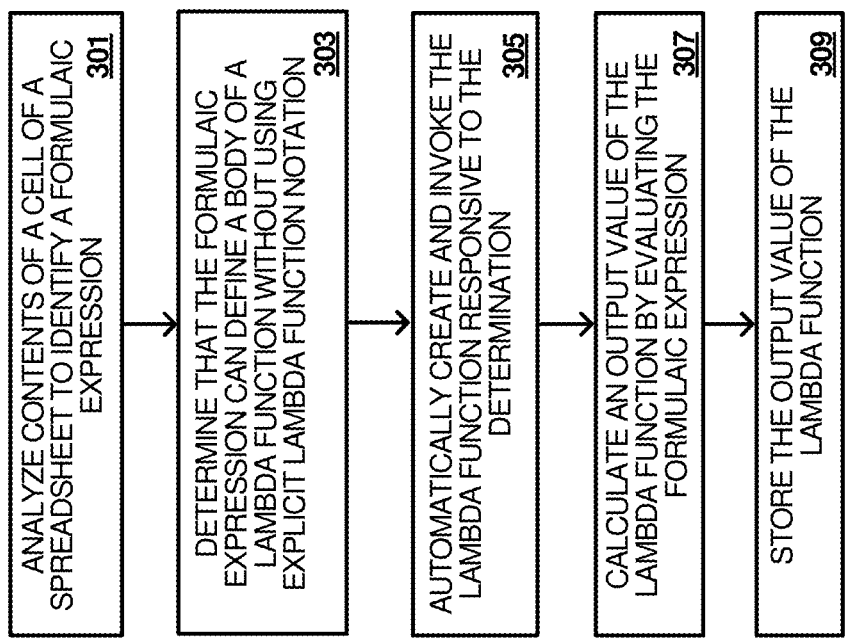
FIG. 3 depicts flow diagram illustrating example operations for automatically creating a lambda function in a spreadsheet application using a lambda shorthand notation, according to some implementations

FIG. 3 depicts flow diagram 300 illustrating example operations for automatically creating a lambda function in a spreadsheet application using a lambda shorthand notation, according to some implementations. The example operations may be performed in various implementations by one or more components of a spreadsheet application such as, for example, spreadsheet application 103 of FIG. 1, or one or more processors, extensions, modules, engines, components or tools associated therewith. Alternative configurations are also possible.

To begin, at 301, the spreadsheet application analyzes contents of a cell of a spreadsheet to identify a formulaic expression. At 303, the spreadsheet application determines that the formulaic expression can define a body of a lambda function without using explicit lambda function notation or parameter declarations. At 305, the spreadsheet application automatically creates and invokes the lambda functions responsive to the determination.

At 307, the spreadsheet application calculates an output value of the lambda function by evaluating the formulaic expression. Lastly, at 309, the spreadsheet application stores the output value of the lambda function.

Figure 4A:
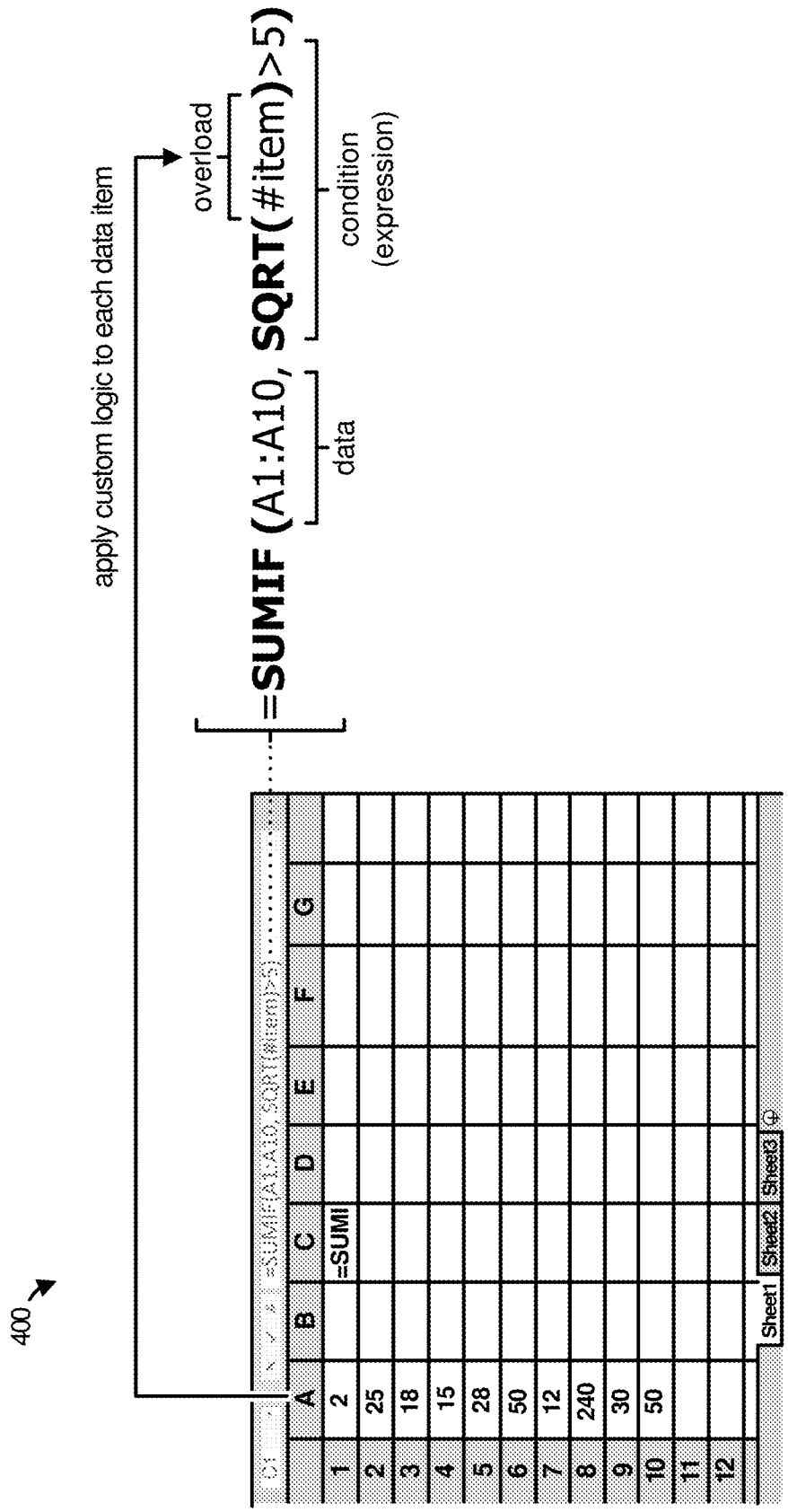
FIGS. 4A and 4B depict an example workbook including a spreadsheet containing data and a formulaic expression operable to automatically create and invoke a lambda function in a spreadsheet application, according to some implementations.
Figure 4B:
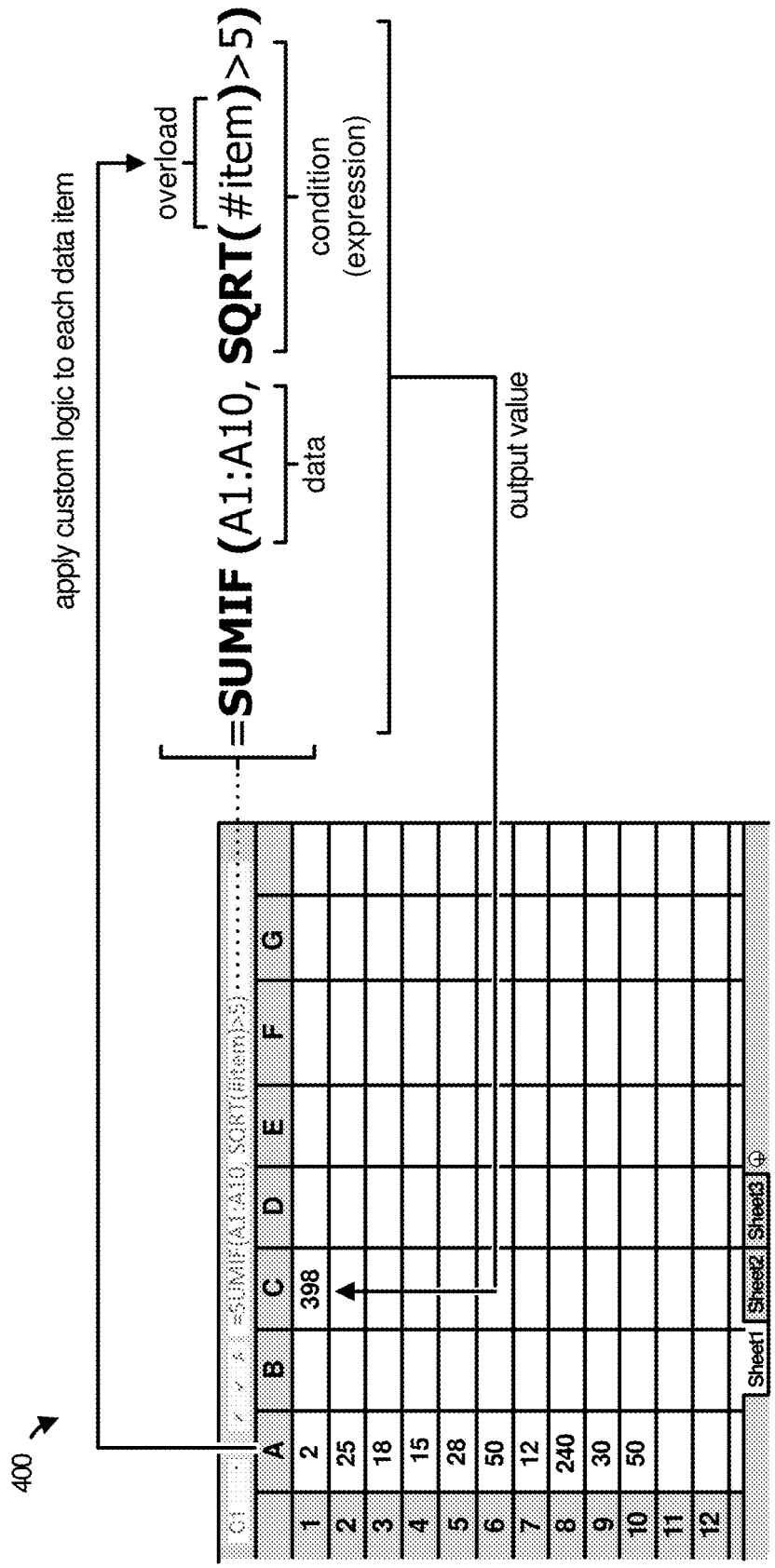

FIGS. 4A and 4B depict an example workbook 400 including a spreadsheet containing data and a formulaic expression operable to automatically create and invoke a lambda function in a spreadsheet application, according to some implementations. More specifically, the example of FIGS. 4A and 4B illustrates the use of an implied variable in a formulaic expression for applying custom logic to data passed to a secondary function, i.e., SUMIF( ) function, for comparison function overloading. The operations may be performed by one or more components of a spreadsheet application such as, for example spreadsheet application 103 of FIG. 1, although alternative configurations are possible.

In the example of FIGS. 4A and 4B, the formulaic expression comprises a conditional argument to a second function, i.e., SUMIF( ) function. It is appreciated that the SUMIF( ) function syntax typically includes the following parameters:

SUMIF (range, criteria, [sum_range]), where, range (required): The range of cells to be evaluated by criteria. Cells in each range must be numbers or names, arrays, or references that contain numbers. Blank and text values are ignored;

criteria (required): The criteria in the form of a number, expression, a cell reference, text, or a function that defines which cells will be added; and sum_range (optional): The actual cells to add, if you want to add cells other than those specified in the range argument. If the sum_range argument is omitted, the spreadsheet application adds the cells that are specified in the range argument (the same cells to which the criteria is applied).

The criteria for the SUMIF function is limited as only simple comparisons are available. However, with the addition of lambda functions and the inclusion of one or more variables, the criteria can be generically extended to allow for any valid expression.

Referring first to the example of FIG. 4A, a spreadsheet application analyzes contents of cell C1 of Sheet1 to identify a formulaic expression. As shown in the example of FIG. 4A, the contents of cell C1 contain the formula '=SUMIF (A1:A10, SQRT(#item>5))' where the formulaic expression described in lambda shorthand is 'SQRT(#item>5)'. The spreadsheet application determines that the formulaic expression 'SQRT(#item>5)' is lambda shorthand that defines a body of a lambda function without using explicit lambda function notation or parameter declarations.

Responsive to this determination, the spreadsheet application automatically creates and invokes a lambda function in the lambda registry with the formulaic expression 'SQRT (#item>5)' as the body of the lambda function. Once created, the lambda function is automatically invoked resulting in an output value. As noted above, with the addition of lambda functions and the inclusion of a variable, e.g., #item, functions can be overloaded to provide for any valid expression within the spreadsheet formula language. This delivers a much more flexible interface for comparison. For instance, in the example of FIGS. 4A and 4B, each item of the included data [A1:A10] can be referenced by referencing #item in the formulaic expression definition. Thus, the variable #item allows the lambda function to be applied individually (or to apply custom logic) to each item of data [A1:A10].

As shown in the example of FIG. 4B, the output value of the lambda function is calculated for each item of the data [A1:A10]. Consequently, the output value of the SUMIF( ) function is =28+50+240+30+50=398.

Figure 5A:
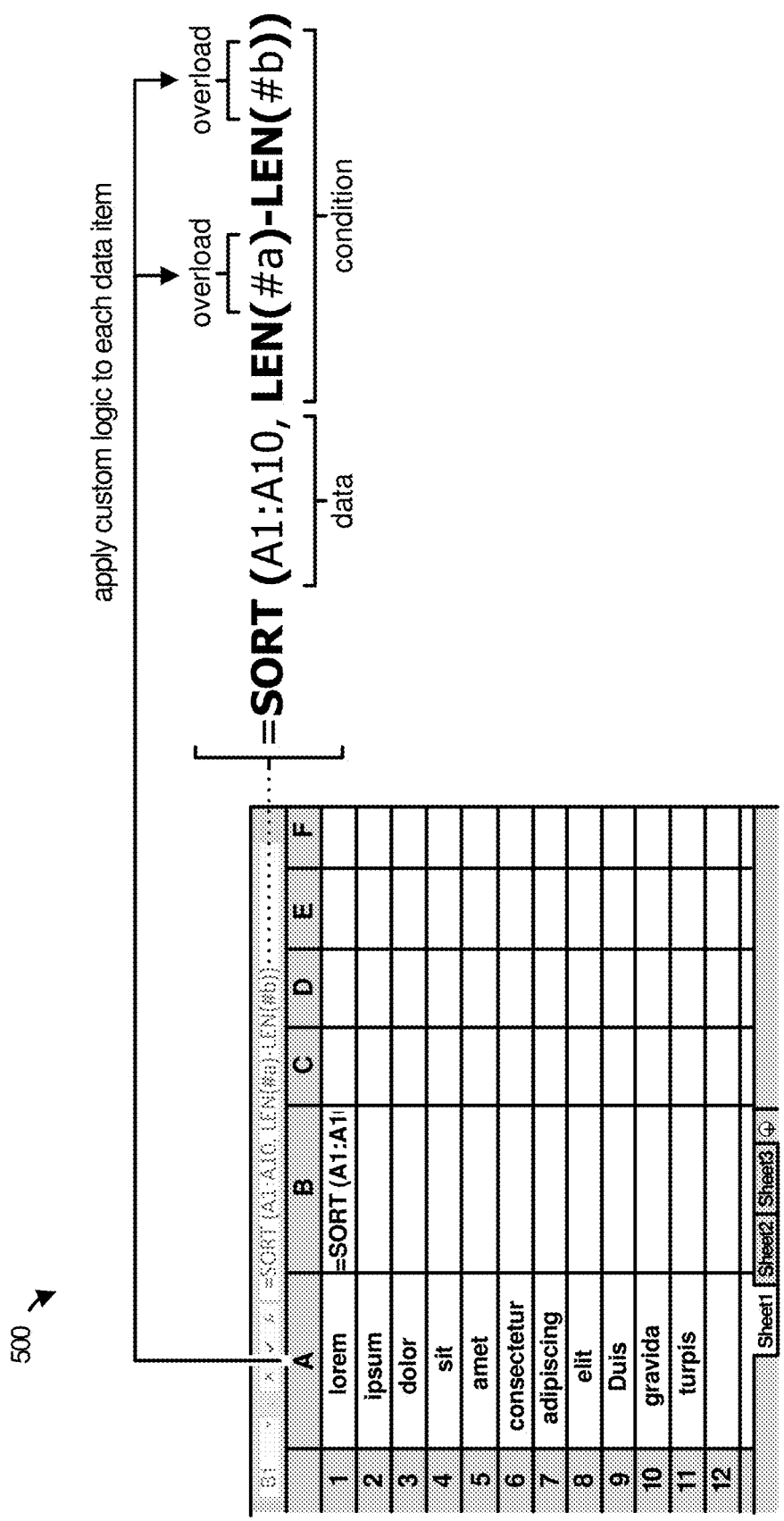
FIGS. 5A and 5B depict an example workbook including a spreadsheet containing data and a formulaic expression operable to automatically create and invoke a lambda function in a spreadsheet application, according to some implementations.
Figure 5B:
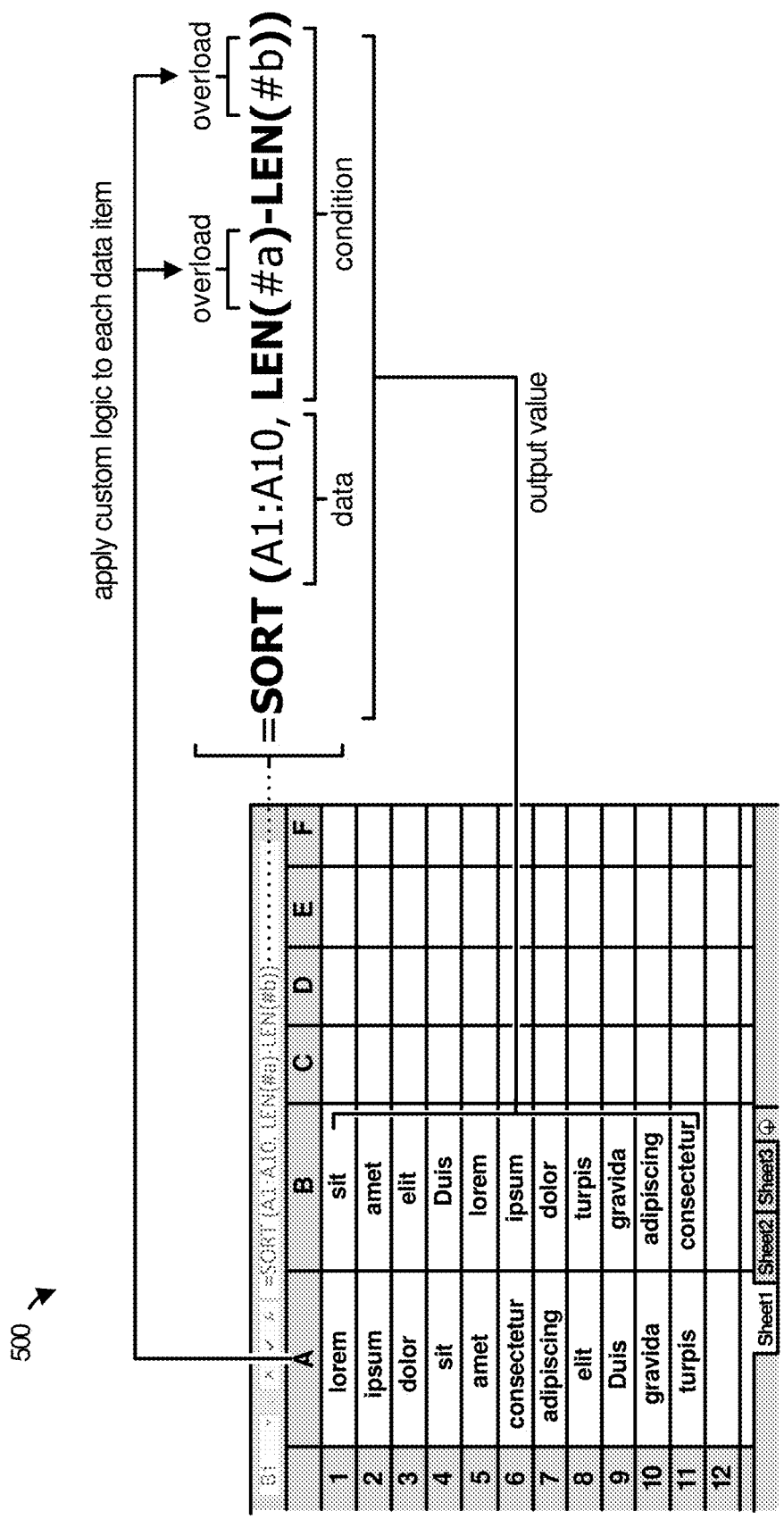

FIGS. 5A and 5B depict an example workbook 500 including a spreadsheet containing data and a formulaic expression operable to automatically create and invoke a lambda function in a spreadsheet application, according to some implementations. More specifically, the example of FIGS. 5A and 5B illustrates the use of multiple implied variables in a formulaic expression for applying custom logic to data passed to a secondary function, i.e., SORT( ) function, for function overloading. The operations may be performed by one or more components of a spreadsheet application such as, for example spreadsheet application 103 of FIG. 1, although alternative configurations are possible.

In the example of FIGS. 5A and 5B, an example illustrating overloading the SORT( ) function to sort an array by the length of the strings is shown. The formulaic expression comprises a condition argument to the SORT( ) function. More specifically, the contents of cell B1 contain the formula '=SORT (A1:A10, LEN(#a)-LEN(#b))'. The formulaic expression described in lambda shorthand is 'LEN(#a)-LEN(#b)', which abbreviates FUN(A, B, LEN(A)-LEN (B)). In this example, #a and #b are overload operator variables for the secondary function, e.g., SORT( ) function. The SORT( ) function can take the form of "a" vs. "b" variables where the sort algorithm uses the result to determine sort order.

Referring first to the example of FIG. 5A, a spreadsheet application analyzes contents of cell B1 of Sheet1 to identify a formulaic expression. As shown in the example of FIG. 5A, the contents of cell B1 contain the formula '=SORT (A1:A10, LEN(#a)-LEN(#b))' where the formulaic expression described in lambda shorthand is 'LEN(#a)-LEN(#b)' which abbreviates FUN(A, B, LEN(A)-LEN(B)). The spreadsheet application determines that the formulaic expression 'LEN(#a)-LEN(#b)' is lambda shorthand that defines a body of a lambda function without using explicit lambda function notation or parameter declarations.

Responsive to this determination, the spreadsheet application automatically creates and invokes a lambda function in the lambda registry with the formulaic expression 'LEN (#a)-LEN(#b)' as the body of the lambda function. Once created, the lambda function is automatically invoked zero, one or more times by the evaluation of SORT( ) resulting in an output value. As noted above, with the addition of lambda functions and the inclusion of the variables (#a and #b), functions can be overloaded to provide for any valid expression within the spreadsheet formula language.

This delivers a much more flexible interface for comparison. For instance, in the example of FIGS. 5A and 5B, each item of the included data [A1:A10] can be referenced and compared by calling in #a and #b in the formulaic expression definition. Thus, the variable (#item) allows the lambda function to be applied individually to each item of data [A1:A10]. Once invoked, the SORT( ) lambda function returns 0, <0, or >0. If the value returned is 0, this means that the items are equivalent, e.g., #a=#b. If the value returned is >0, this means that the length of #a is greater than the length of #b. Likewise, if the value returned is <0, this means that length of #a is less than the length of #b.

The output value of the lambda function is calculated for comparison of items of the data [A1:A10]. Consequently, as shown in the example of FIG. 4B, the output value of the SORT( ) function sorts the array of words from shortest (e.g., three characters) to longest (e.g., eleven characters).

Although not shown in the examples of FIGS. 4A and 4B or FIGS. 5A and 5B, the use of lambda functions and implicit variables can also be applied in other areas such as data validation and formatting. For example, in the case of data validation, a lambda function can be created, similar to the FILTER( ) function example of FIGS. 5A and 5B, where the function return TRUE or FALSE for whether a given data item is valid. Likewise, for the case of formatting, the conditional formatting which exists today and can be driven by formulas. Furthermore, with the addition of implied #items, the comparisons can than can be achieved are much more flexible and powerful.

FIGS. 6A and 6B depict an example λ expression optimization for spreadsheet applications, according to some implementations. More specifically, the example of FIGS. 6A and 6B illustrate a repeated expression optimization operating on a spreadsheet 600 which is enabled through an automatically created LET or lambda function. The operations may be performed by one or more components of a spreadsheet application such as, for example spreadsheet application 103 of FIG. 1, although alternative configurations are possible.

Referring first the FIG. 6A, a spreadsheet application is configured to identify the repeated expression 'SUM(Series1)' and automatically create a LET defined by the repeated expression. As shown in FIG. 6B, the cells containing the repeated expression are then provided with a reference to the LET function. As noted above, providing a detection and abstraction mechanism allows the expression to be calculated once regardless of the number of instances in which the formulaic expression is referenced in the spreadsheet.

In some implementations, providing the reference to the LET can include replacement or rendering, within the cell, an indication that the cell contains a LET. Various representations (graphical or otherwise) of the LET are possible. As shown in the example of FIG. 6B, the LET is defined in the cell as =LET(mySum, Sum(Series1), mySum+mySum).

Consequently, as shown above, the LET allows a user to locally name the value of an intermediate expression and refer to that value by name in the spreadsheet to avoid repeated evaluation of the intermediate expression. Although not shown, lambda function could also be used to provide similar functionality.

Figure 7A:
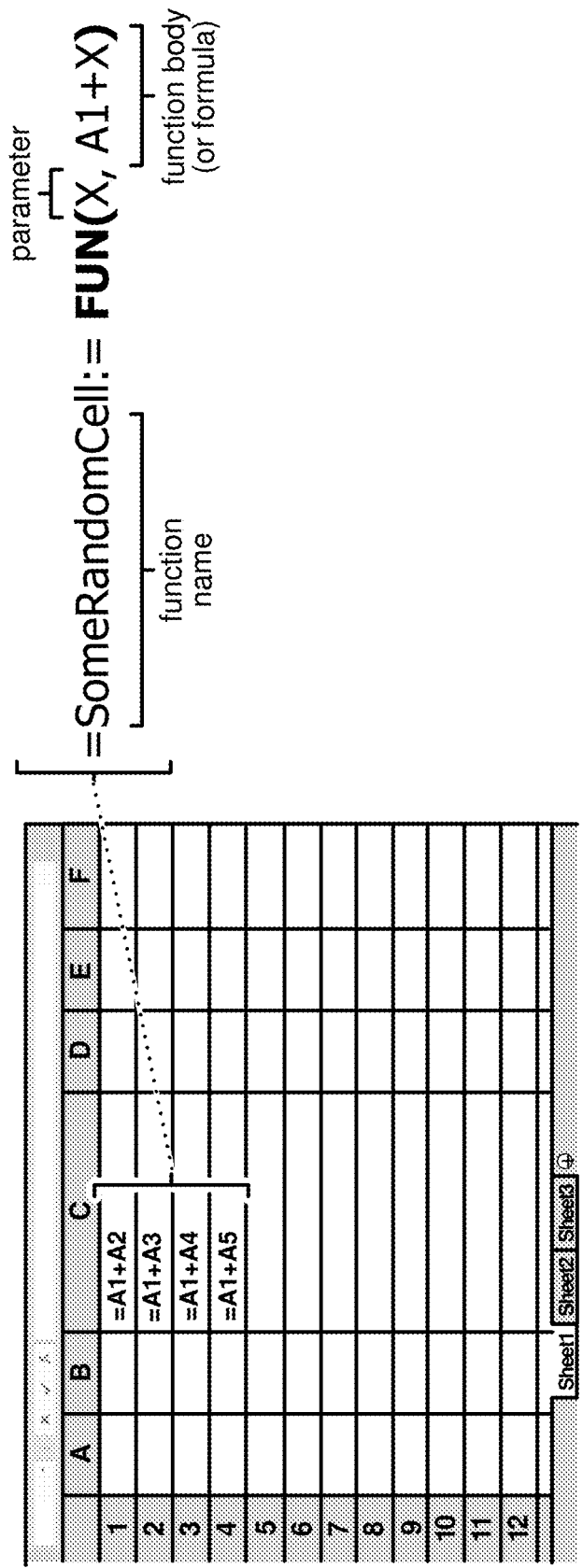
FIGS. 7A and 7B depict example lambda expression optimizations for spreadsheet applications, according to some implementations.
Figure 7B:
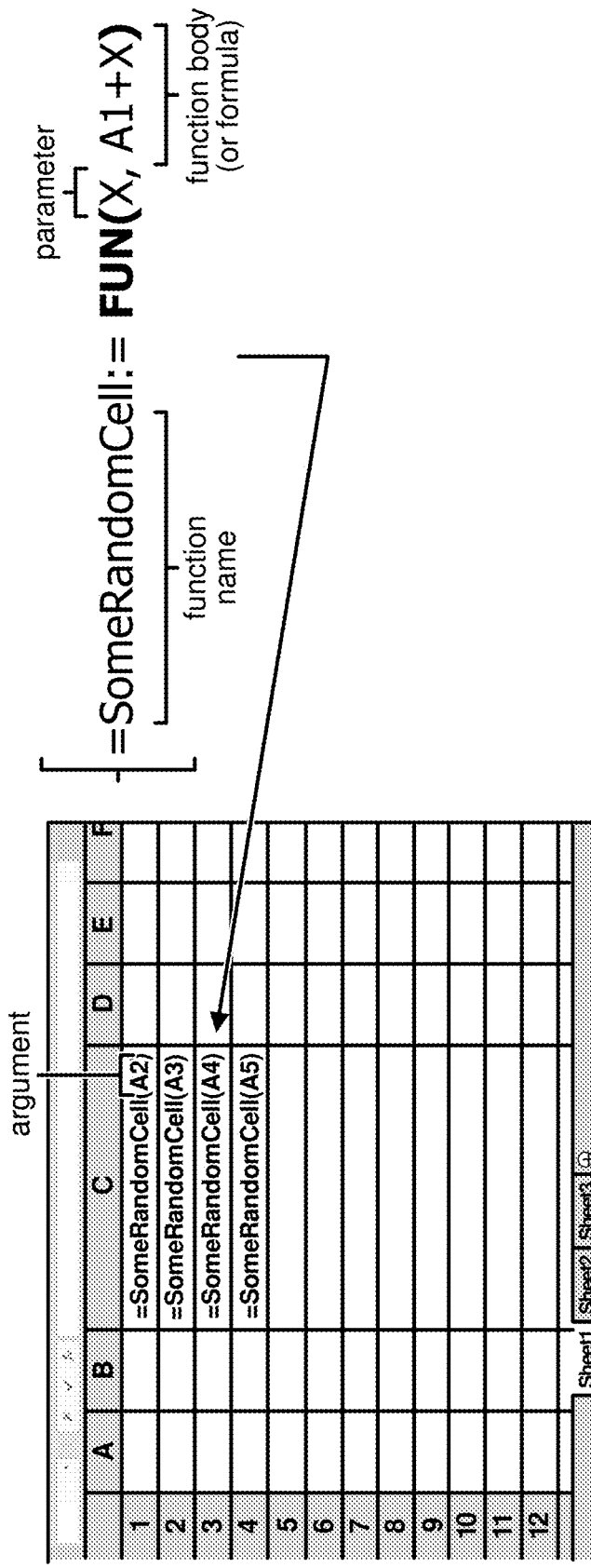

FIGS. 7A and 7B depict another example λ expression optimization for spreadsheet applications, according to some implementations. More specifically, the example of FIGS. 7A and 7B illustrate automated function detection and abstraction on a spreadsheet 700. The operations may be performed by one or more components of a spreadsheet application such as, for example spreadsheet application 103 of FIG. 1, although alternative configurations are possible.

Referring first the FIG. 7A, a spreadsheet application is configured to analyze cells of the spreadsheet to detect and extract a function body. As shown in the example of FIG. 7A, cells C1-C4 are analyzed to detect and extraction a common formulaic expression 'A1+X' where X is a variable.

Responsive to this detection, the spreadsheet application automatically creates a lambda function using the extracted formulaic expression. In this example, lambda function is named 'SomeRandomCell( )'. As shown in FIG. 7B, the cells containing the common formulaic expression are then replaced with a reference or call to the lambda function with the appropriate argument.

FIG. 8 depicts a computing system 801, which is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809 (optional).

Processing system 802 loads and executes software 805 from storage system 803. Software 805 includes various processes, which are generally representative of the processes discussed with respect to the preceding Figures and additional examples below. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include the processes discussed herein. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system for handing approximate values in spreadsheet applications. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The techniques discussed herein can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
one or more computer readable storage media;
program instructions stored on the one or more computer readable storage media including one or more components of a spreadsheet application, wherein the program instructions, when executed by one or more processing systems, direct the one or more processing systems to:
identify a formulaic expression, inside a formula of a cell of a spreadsheet, wherein the cell lacks explicit user-defined function notation, and the formulaic expression includes an implicit variable;
determine that the formulaic expression defines a body of a new user-defined function; and
responsive to the determination, automatically register the new user-defined function in a lambda registry using the formulaic expression as the body of the new user-defined function.

2. The apparatus of claim 1, wherein the program instructions, when executed by the one or more processing systems, further direct the one or more processing systems to:
replace the formulaic expression in the cell with a reference to the new user-defined function, and also in one or more other cells of the spreadsheet that include the formulaic expression; and
invoke the new user-defined function by evaluating the formulaic expression and calculating an output value of the new user-defined function.

3. The apparatus of claim 1, wherein the formulaic expression comprises an argument to a second function in the cell of the spreadsheet, wherein the body of the new user-defined function includes only the formulaic expression, and wherein the second function comprises a native function of the spreadsheet application.

4. The apparatus of claim 3, wherein the second function includes at least one data parameter and at least one conditional parameter, and wherein the formulaic expression comprises an argument corresponding to the at least one conditional parameter.

5. The apparatus of claim 4, wherein the implicit variable is operable to reference each item of data passed to the second function via a data argument corresponding to the at least one data parameter, wherein the data comprises multiple values from multiple cells in the spreadsheet.

6. The apparatus of claim 5, wherein the formulaic expression includes predetermined syntax identifying the implicit variable, and wherein the second function is not a user-defined function.

7. The apparatus of claim 5, wherein the implicit variable is operable to overload the second function.

8. The apparatus of claim 5, wherein the program instructions, when executed by the one or more processing systems, direct the one or more processing systems to:
parse the formulaic expression to identify one or more variables.

9. The apparatus of claim 8, wherein to create the new user-defined function, the spreadsheet application registers the new user-defined function in the lambda registry using the one or more variables as arguments to the new user-defined function, wherein the one or more variables include the implicit variable.

10. The apparatus of claim 9, wherein the program instructions, to identify the formulaic expression, direct the one or more processing systems to:
analyze cells of the spreadsheet to identify a repeated expression that lacks the explicit user-defined notation.

11. The apparatus of claim 10, wherein the formulaic expression in the cell comprises an instance of the repeated expression.

12. The apparatus of claim 10, wherein the repeated expression is representative of an intermediate calculation.

13. The apparatus of claim 1, wherein the formula in the cell comprises two or more instances of the formulaic expression, wherein at least a first instance of the formulaic expression comprises a recursive instance of the formulaic expression.

14. An apparatus comprising:
one or more processing systems;
one or more computer readable storage media storing:
at least one lambda registry data structure; and
program instructions including one or more components of a spreadsheet application, wherein the program instructions, when executed by one or more processing systems, direct the one or more processing systems to:
identify a formulaic expression, inside a formula of a cell of a spreadsheet, wherein the cell lacks explicit user-defined function notation, and the formulaic expression includes an implicit variable;
determine that the formulaic expression defines a body of a new user-defined function;
responsive to the determination, automatically register the new user-defined function with a lambda registry using the formulaic expression as the body of the new user-defined function responsive to the determination; and
invoke the new user-defined function by evaluating the formulaic expression and calculating an output value of the new user-defined function.

15. The apparatus of claim 14, wherein the formulaic expression comprises an argument to a second function in the cell of the spreadsheet, wherein:
the body of the new user-defined function includes only the formulaic expression;
the second function comprises a native function of the spreadsheet application; and
the second function includes at least one data parameter and at least one conditional parameter, and wherein the formulaic expression comprises an argument corresponding to the at least one conditional parameter.

16. The apparatus of claim 15, wherein the implicit variable is operable to reference each item of data passed to the second function via a data argument corresponding to the at least one data parameter, wherein the data comprises multiple values from multiple cells in the spreadsheet.

17. The apparatus of claim 14, wherein the program instructions, to identify the formulaic expression, direct the one or more processing systems to:
analyze cells of the spreadsheet to identify a repeated expression that lacks the explicit user-defined notation.

18. The apparatus of claim 14, wherein the formula in the cell comprises two or more instances of the formulaic expression, wherein at least a first instance of the formulaic expression comprises a recursive instance of the formulaic expression.

19. A method of operating a spreadsheet application to automatically create a new user-defined function, the method comprising:
identifying a formulaic expression, inside a formula of a cell of a spreadsheet, wherein the cell lacks explicit user-defined function notation, and the formulaic expression includes an implicit variable;
determining that the formulaic expression defines a body of a new user-defined function; and
responsive to the determination, automatically registering the new user-defined function in a lambda registry using the formulaic expression as the body of the new user- defined function.

20. The method of claim 19, wherein the formulaic expression comprises an argument to a second function in the cell of the spreadsheet, wherein: the body of the new user-defined function includes only the formulaic expression, the second function comprises a native function of the spreadsheet application, and the second function includes at least one data parameter and at least one conditional parameter; and wherein the formulaic expression comprises an argument corresponding to the at least one conditional parameter.

* * * * *